INVENTOR
Robert Weiss
BY S. A. Giarratana &
F. L. Masselle
ATTORNEYS

Fig. 3b

INVENTOR
Robert Weiss

BY S.A. Giarratana &
F.L. Masselle
ATTORNEYS

Fig. 4.

United States Patent Office 3,463,909
Patented Aug. 26, 1969

3,463,909
VECTOR SENSING SYSTEM
Robert Weiss, Santa Clara, Calif., assignor to Singer-General Precision, Inc., a corporation of Delaware
Filed Aug. 15, 1966, Ser. No. 572,417
Int. Cl. G06f *15/50;* G06g *7/70, 7/78*
U.S. Cl. 235—150.25
11 Claims

ABSTRACT OF THE DISCLOSURE

A vector sensing system with malfunction detection comprising three primary vector sensors sensing the components of a vector along a first set of three axes, a plurality of redundant vector sensors sensing the components of said vector along three axes skewed relative to said first set of axes, and malfunction detection means responsive to the output signals of said primary and redundant vector sensors to indicate which, if any, of said primary vector sensors is malfunctioning.

---

This invention relates to vector sensing systems and more particularly to a vector sensing system with redundant vector sensors, which are used to detect malfunction of the primary vector sensors and to generate signals to be substituted for the output signals of the primary vector sensors when the primary vector sensors malfunction.

In accordance with the present invention, three vector sensors are arranged to sense the components of a vector along three axes which are preferably orthogonal. These three vector sensors are referred to as the primary vector sensors. Additional vector sensors, referred to as redundant vector sensors, sense components of the vectors along axes skewed relative to the axes sensed by the primary vector sensors. The output signals of the redundant vector sensors are then used to check for malfunctioning of the primary vector sensors and to provide signals to replace the output signals of the primary vector sensors in case of malfunction.

Because the redundant vector sensors sense along axes which are skewed relative to the primary vector sensors, the system is highly efficient in detecting malfunction, in that a fewer number of redundant vector sensors are needed to identify the malfunctioning vector sensors. Moreover, the output signals from the redundant vector sensors may be combined with each other to replace the output signal of each primary vector sensor, and the output signal of each redundant vector sensor can be combined with output signals of the primary vector sensors to replace the output signal of any primary vector sensor.

In the preferred embodiment of the invention, comprising three primary vector sensors and three redundant vector sensors, the system will detect and identify the malfunction of any two of the vector sensors and replace the output signals of the malfunctioning vector sensors. The system will also detect and indicate a condition of malfunction of three or more of the vector sensors. Thus a highly reliable and efficient system is provided.

Accordingly, an object of the present invention is to provide a vector sensing system with improved malfunction detection and output signal replacement means.

Another object of the present invention is to provide a highly reliable vector sensing system.

A further object of the present invention is to provide a vector sensing system with a malfunctioning detection means which is highly efficient in the number of redundant vector sensors required to identify the malfunctioning vector sensors.

Further objects and advantages of the present invention will become readily apparent when taken in conjunction with the drawings, wherein.

Figure 1:
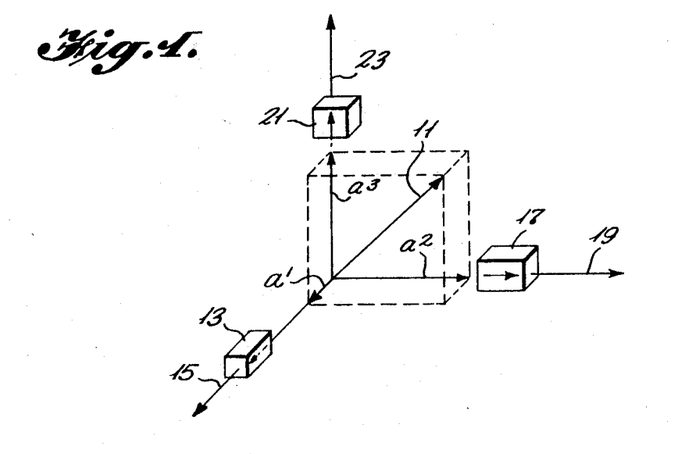
FIG. 1 schematically illustrates a vector sensing system having three vector sensors sensing along orthogonal axes.

FIG. 1 schematically illustrates a system for detecting the magnitude and direction of a vector 11 in three-dimensional space. As shown in FIG. 1, a sensor 13 detects the magnitude of the component of the vector 11 lying along the axis 15. A sensor 17 detects the magnitude of the component of the vector 11 lying along an axis 19 perpendicular to the axis 15. A sensor 21 detects the magnitude of the component of the vector 11 lying along an axis 23 perpendicular to the axes 15 and 19. The vector sensors 13, 17 and 21 are referred to as the primary vector sensors. The value sensed by the sensor 13 is designated $a_1$; the value sensed by the sensor 17 is designated $a_2$; and the value sensed by the sensor 21 is designated $a_3$. The values $a_1$, $a_2$ and $a_3$ will provide an indication of the magnitude and direction of the vector 11.

Figure 2:
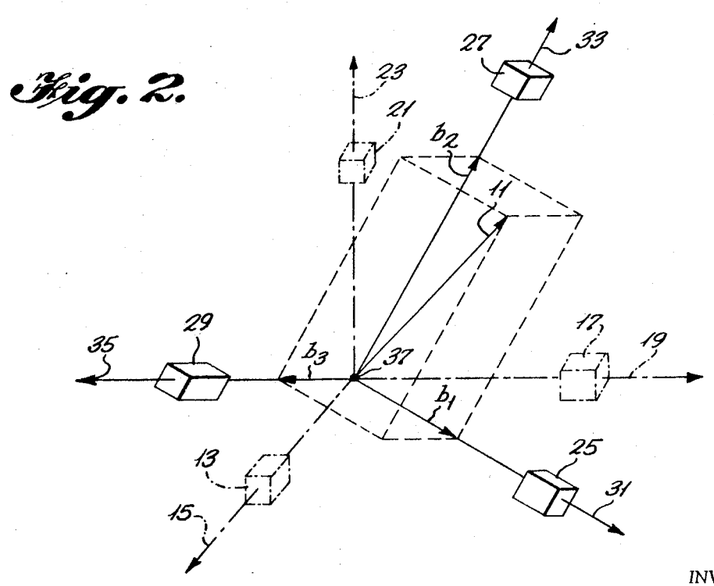
FIG. 2 illustrates the vector detection system of FIG. 1 with three redundant vector sensors sensing along axes skewed relative to the primary vector sensors of the system of FIG. 1.

FIG. 2 illustrates how a second triad of vector sensors may be employed to provide a malfunction detection and replacement system in accordance with the present invention. As shown in FIG. 2, the triad of vector sensors 25, 27 and 29 are provided to sense the magnitude of the components of the vector 11 lying along three additional axes 31, 33 and 35, which in the illustrated embodiment are mutually perpendicular. The vector sensors 25, 27 and 29 are referred to as the redundant vector sensors. As shown in FIG. 2, the axes 31, 33 and 35 are selected so that they are skewed relative to the axes 15, 19 and 23. Since the sensors 25, 27 and 29 are sensing the magnitude of the same vector that the sensors 13, 17 and 21 are sensing, the axes 31, 33 and 35 have a common origin 37 with the axes 15, 17 and 23. The value sensed by the sensor 35 is designated $b_1$; the value sensed by the sensor 27 is designated $b_2$; and the value sensed by the sensor 29 is designated $b_3$. From the outputs of the sensors 25, 27 and 29, it can be determined whether any of the sensors 13, 17 and 21 are malfunctioning. If not more than two of all of the sensors including the sensors 25, 27 and 29 are malfunctioning, then it can be determined which ones of the sensors are malfunctioning and the outputs from the malfunctioning sensors can be replaced in accordance with the system of the present invention. To define the alignment of the axes 31, 33 and 35 relative to the axes 15, 19 and 23, it may first be assumed that the axes 31, 33 and 35 are aligned with the axes 15, 19 and 23, respectively. Then the three orthogonal axes 31, 33 and 35 are rotated through an angle $\alpha$ about the axis 15. After this rotation has been completed, the three orthogonal axes 31, 33 and 35 are rotated through an angle $\beta$ about the axis 19. Finally, the three axes 31, 33 and 35 are rotated through an angle $\lambda$ about the axis 23 to place the three axes in the position illustrated in FIG. 2.

The values $a_1$, $a_2$ and $a_3$ are designated as a triad $\overline{A}$. The quantities $b_1$, $b_2$ and $b_3$ are designated as a triad $\overline{B}$.

In the absence of malfunctions, triads $\overline{A}$ and $\overline{B}$ are related through a transformation matrix T as follows:

$$\begin{pmatrix} a_1 \\ a_2 \\ a_3 \end{pmatrix} = \begin{bmatrix} t_{11} t_{12} t_{13} \\ t_{21} t_{22} t_{23} \\ t_{31} t_{32} t_{33} \end{bmatrix} \begin{pmatrix} b_1 \\ b_2 \\ b_3 \end{pmatrix} \quad (1)$$

in which $$\begin{bmatrix} t_{11} t_{12} t_{13} \\ t_{21} t_{22} t_{23} \\ t_{31} t_{32} t_{33} \end{bmatrix}$$

is the transformation matrix T.

The above mathematical notation means that $$a_1 = t_{11} b_1 + t_{12} b_2 + t_{13} b_3$$

that $a_2 = t_{21} b_1 + t_{22} b_2 + t_{23} b_3$; and that $$a_3 = t_{31} b_1 + t_{32} b_2 + t_{33} b_3$$

The values of the terms of the transformation matrix T in terms of the angles $\alpha$, $\beta$ and $\lambda$ are given in Table I:

TABLE I $t_{11} = \cos\beta \cos\lambda$
$t_{12} = -\cos\beta \sin\lambda$
$t_{13} = \sin\beta$
$t_{21} = \cos\alpha \sin\lambda + \sin\alpha \sin\beta \cos\lambda$
$t_{22} = \cos\alpha \cos\lambda - \sin\alpha \sin\beta \sin\lambda$
$t_{23} = -\sin\alpha \cos\beta$
$t_{31} = \sin\alpha \sin\lambda - \cos\alpha \sin\beta \cos\lambda$
$t_{32} = \sin\alpha \cos\lambda + \cos\alpha \sin\beta \sin\lambda$
$t_{33} = \cos\alpha \cos\beta$ The triad $\overline{B}$ can be related to the triad $\overline{A}$ through the transformation matrix $T^{-1}$ as follows:

$$\begin{pmatrix} b_1 \\ b_2 \\ b_3 \end{pmatrix} = \begin{bmatrix} t_{11} t_{21} t_{31} \\ t_{12} t_{22} t_{32} \\ t_{13} t_{23} t_{33} \end{bmatrix} \begin{pmatrix} a_1 \\ a_2 \\ a_3 \end{pmatrix} \quad (2)$$

The values of the terms of the matrix $T^{-1}$ can also be found in Table I since they are merely a rearrangement of the values in the transformation matrix T.

In the preferred embodiment of the invention, the angles $\alpha$, $\beta$ and $\lambda$ all equal 45°. This arrangement maximizes the distances of the axes 31, 33 and 35 of the redundant sensors from the axes 15, 19 and 23 of the primary sensors so that the sensitivity of the system in detecting malfunction and the accuracy of the system in replacing the output signal of a malfunctioning vector sensor are maximized.

With the values of $\alpha$, $\beta$ and $\lambda$ selected to be 45°, the values of the quantities in the transformation matrices T and $T^{-1}$ can be determined and are given in Table II:

TABLE II

| | | |
|---|---|---|
| $t_{11} = 0.500$ | $t_{12} = -0.500$ | $t_{13} = 0.707$ |
| $t_{21} = 0.854$ | $t_{22} = 0.146$ | $t_{23} = -0.500$ |
| $t_{31} = 0.146$ | $t_{32} = 0.854$ | $t_{33} = 0.500$ |

Thus the transformation matrices T and $T^{-1}$ become $$T = \begin{bmatrix} 0.500 & -0.500 & 0.707 \\ 0.854 & 0.146 & -0.500 \\ 0.146 & 0.854 & 0.500 \end{bmatrix} \quad (3)$$

$$T^{-1} = \begin{bmatrix} 0.500 & 0.854 & 0.146 \\ -0.500 & 0.146 & 0.854 \\ 0.707 & -0.500 & 0.500 \end{bmatrix} \quad (4)$$

Inserting the values for the transformation matrices T and $T^{-1}$ in Equations 1 and 2 for the triads $\overline{A}$ and $\overline{B}$, the following equations result:

$$\begin{pmatrix} a_1 \\ a_2 \\ a_3 \end{pmatrix} = \begin{bmatrix} 0.500 & -0.500 & 0.707 \\ 0.854 & 0.146 & -0.500 \\ 0.146 & 0.854 & 0.500 \end{bmatrix} \begin{pmatrix} b_1 \\ b_2 \\ b_3 \end{pmatrix} \quad (5)$$

$$\begin{pmatrix} b_1 \\ b_2 \\ b_3 \end{pmatrix} = \begin{bmatrix} 0.500 & 0.854 & 0.146 \\ -0.500 & 0.046 & 0.854 \\ 0.707 & -0.500 & 0.500 \end{bmatrix} \begin{pmatrix} a_1 \\ a_2 \\ a_3 \end{pmatrix} \quad (6)$$

From Equations 5 and 6 we can derive the following equations:

$$a_1 - 0.500 b_1 + 0.500 b_2 - 0.707 b_3 = 0 \quad (7)$$
$$a_2 - 0.854 b_1 - 0.146 b_2 + 0.500 b_3 = 0 \quad (8)$$
$$a_3 - 0.146 b_1 - 0.854 b_2 - 0.500 b_3 = 0 \quad (9)$$
$$b_1 - 0.500 a_1 - 0.854 a_2 - 0.146 a_3 = 0 \quad (10)$$
$$b_2 + 0.500 a_1 - 0.146 a_2 - 0.854 a_3 = 0 \quad (11)$$
$$b_3 - 0.707 a_1 + 0.500 a_2 - 0.500 a_3 = 0 \quad (12)$$

The Equations 7 through 12 will be correct, that is, the expression on the left side of the equal sign will equal 0, if none of the vector sensors are malfunctioning. However, if one or more of the vector sensors are malfunctioning, the corresponding one or more of the terms $a_1$, $a_2$, $a_3$, $b_1$, $b_2$ and $b_3$ as represented by the output signals of the malfunctioning vector sensors will be incorrect. Accordingly, some of the expressions of the Equations 7 through 12 will not equal 0. Therefore, Equations 7 through 12 are rewritten as follows:

$$e_1 = a_1 - 0.500 b_1 + 0.500 b_2 - 0.707 b_3 \quad (13)$$
$$e_2 = a_2 - 0.854 b_1 - 0.146 b_2 + 0.500 b_3 \quad (14)$$
$$e_3 = a_3 - 0.146 b_1 - 0.854 b_2 - 0.500 b_3 \quad (15)$$
$$d_1 = b_1 - 0.500 a_1 - 0.854 a_2 - 0.146 a_3 \quad (16)$$
$$d_2 = b_2 + 0.500 a_1 - 0.146 a_2 - 0.854 a_3 \quad (17)$$
$$d_3 = b_3 - 0.707 a_1 + 0.500 a_2 - 0.500 a_3 \quad (18)$$

In Equations 13 through 18, the terms $e_1$, $e_2$, $e_3$, $d_1$, $d_2$ and $d_3$ represent error terms that may result if one or more of the vector sensors 13, 17, 21, 25, 27 or 29 malfunctions. If none of the vector sensors are malfunctioning, so that $a_1$, $a_2$, $a_3$, $b_1$, $b_2$ and $b_3$ are all correct, then all of the terms $e_1$, $e_2$ and $e_3$, as well as $d_1$, $d_2$ and $d_3$, will be 0. Therefore, the generation of error signals corresponding to the error terms $e_1$, $e_2$, $e_3$, $d_1$, $d_2$ and $d_3$ and the sensing of these error signals would provide a check as to whether the outputs of the vector sensors representing $a_1$, $a_2$, $a_3$, $b_1$, $b_2$ and $b_3$ are correct.

If one of the primary vector sensors 13, 17 or 21 malfunctions, then one of the terms $e_1$, $e_2$ and $e_3$ will not be 0, and all three of the terms $d_1$, $d_2$ and $d_3$ will not be 0. For example, if the vector sensor 13 should malfunction, the error terms in the equations which contain $a_1$ will not be 0. Since $a_1$ appears in Equation 13 and all three of the Equations 16 through 18, the terms $e_1$, $d_1$, $d_2$ and $d_3$ will not be 0. Similarly, if the sensor 17 malfunctions so that $a_2$ is not correct, the term $e_2$ of Equation 14 will not be 0, and all three of the terms $d_1$, $d_2$ and $d_3$ of Equations 16 through 18 will not be 0. Likewise, if the vector sensor 21 should malfunction, then $e_3$, $d_1$, $d_2$ and $d_3$ will not be 0. If the vector sensor 25 should malfunction, then $d_1$ will not be 0 and $e_1$, $e_2$ and $e_3$ will all three not be 0. Similarly, if the vector sensors 27 or 29 should malfunction, the terms $d_2$ or $d_3$, respectively, would not be 0, and $e_1$, $e_2$ and $e_3$ would not be 0.

If two of the primary vector sensors 13, 17 and 21 should malfunction, then two of the terms $e_1$, $e_2$ and $e_3$ corresponding to the malfunctioning vector sensors would not be 0 and all three of the terms $d_1$, $d_2$ and $d_3$ would also not be 0. If two of the redundant vector sensors 25, 27 or 29 should fail, then the two of the terms $d_1$, $d_2$ and $d_3$ corresponding to the two malfunctioning redundant vector sensors would not be 0, and all three of the terms $e_1$, $e_2$ and $e_3$ would not be 0. Thus by sensing whether the signals generated to represent the error terms $e_1$, $e_2$, $e_3$, $d_1$, $d_2$ and $d_3$ are 0, the malfunctioning vector sensors can be easily identified if only one of the vector sensors is malfunctioning, if two of the primary vector sensors are malfunctioning, or if two of the redundant vector sensors are malfunctioning.

If only one of the primary vector sensors 13, 17 and 21 should malfunction, and only one of the redundant vector sensors 25, 27 and 29 should malfunction, then all of the error terms $e_1$, $e_2$, $e_3$, $d_1$, $d_2$ and $d_3$ would not be 0 and it would not be immediately apparent from inspection of these terms how many or which vector sensors have failed. The fact that all six of the error terms are not 0 indicates that at least two vector sensors are malfunctioning, but it is not certain whether it is only two or more than two.

In the case where all six of the error terms are not 0, a test can be devised to determine whether only one of the primary vector sensors and only one of the redundant vector sensors are malfunctioning and, if so, which of the vector sensors are malfunctioning. For example, if only the primary vector sensor 21 and the redundant vector sensor 25 are malfunctioning, only the terms $a_3$ and $b_1$ will be incorrect. These incorrect terms may be expressed as follows:

$$a_3 = a_3^* + \epsilon_{a3} \quad (19)$$
$$b_1 = b_1^* + \epsilon_{b1} \quad (20)$$

in which $a_3^*$ and $b_1^*$ are the correct values for $a_3$ and $b_1$ and $\epsilon_{a3}$ and $\epsilon_{b1}$ are the errors in $a_3$ and $b_1$ due to the malfunctioning of the sensors 21 and 25. If the expression for $b_1$ given in Equation 20 is substituted in Equations 13 and 14, the following equations result:

$$e_1 = a_1 - 0.500 b_1^* - 0.500\epsilon_{b1} + 0.500 b_2 - 0.707 b_3 \quad (21)$$
$$e_2 = a_2 - 0.854 b_1^* - 0.854\epsilon_{b1} - 0.146 b_2 + 0.500 b_3 \quad (22)$$

In Equations 21 and 22, the terms $e_1$ and $e_2$ would be 0 except for the terms containing $\epsilon_{a3}$ and $\epsilon_{b1}$ because the remaining terms $a_1$, $a_2$, $b_1^*$, $b_2$ and $b_3$ have the correct value in the exemplary test being explained when only $a_3$ and $b_1$ are incorrect. Accordingly, $e_1$ and $e_2$ can be expressed as follows:

$$e_1 = -0.500\epsilon_{b1} \quad (23)$$
$$e_2 = -0.854\epsilon_{b1} \quad (24)$$

From Equations 23 and 24 it can be seen that:

$$0.500 e_2 - 0.854 e_1 = 0 \quad (25)$$

Thus Equation 25 will be true if only the terms $a_3$ and $b_1$ are incorrect resulting from the malfunctioning of the vector sensors 21 and 25. Accordingly, by summing the signals representing the terms $e_1$ and $\lambda_2$ in the manner indicated by Equation 25, it can be determined whether the vector sensors 21 and 25 are the only two malfunctioning vector sensors when all of the error terms $e_1$, $e_2$, $e_3$, $d_1$, $d_2$ and $d_3$ are not 0.

A similar test can be devised for each possible pair of primary and redundant vector sensors. By a derivation similar to that described above, it can be seen that if the malfunctioning pair of vector sensors are sensors 17 and 25, so that the values $a_2$ and $b_1$ are incorrect, then the following expression will be true:

$$0.146 e_1 - 0.500 e_3 = 0 \quad (26)$$

Likewise, if only the vector sensors 21 and 27 are malfunctioning, causing the values $a_3$ and $b_2$ to be incorrect, the following expression will be true:

$$0.146 e_1 + 0.500 e_2 = 0 \quad (27)$$

If only the vector sensors 17 and 27 are malfunctioning so that the values $a_2$ and $b_2$ are incorrect, the following expression will be true:

$$0.854 e_1 + 0.500 e_3 = 0 \quad (28)$$

If only the vector sensors 21 and 29 are malfunctioning so that the values $a_3$ and $b_3$ are incorrect, the following expression will be true:

$$0.500 e_1 + 0.707 e_2 = 0 \quad (29)$$

If only the vector sensors 17 and 29 are malfunctioning so that the values $a_2$ and $b_3$ are incorrect, the following expression will be true:

$$0.500 e_1 - 0.707 e_3 = 0 \quad (30)$$

If only the vector sensors 13 and 25 are malfunctioning so that the values $a_1$ and $b_1$ are incorrect, the following expression will be true:

$$0.146 e_2 - 0.854 e_3 = 0 \quad (31)$$

If only the vector sensors 13 and 27 are malfunctioning so that the values $a_1$ and $b_2$ are incorrect, the following expression will be true:

$$0.854 e_2 - 0.146 e_3 = 0 \quad (32)$$

If only the vector sensors 13 and 29 are malfunctioning so that the values $a_1$ and $b_3$ are incorrect, the following expression will be true:

$$0.500 e_2 + 0.500 e_3 = 0 \quad (33)$$

Thus, when all six of the error values are not 0, it can be determined if only one primary and one redundant vector sensor are malfunctioning by generating signals representing the expressions in Equations 25 through 33 and determining if any one of these signals is 0. If one of the signals is 0, then it will identify the pair of malfunctioning vector sensors. A similar test could be provided using the error terms $d_1$, $d_2$ and $d_3$ instead of the error terms $e_1$, $e_2$ and $e_3$.

Figure 3A:
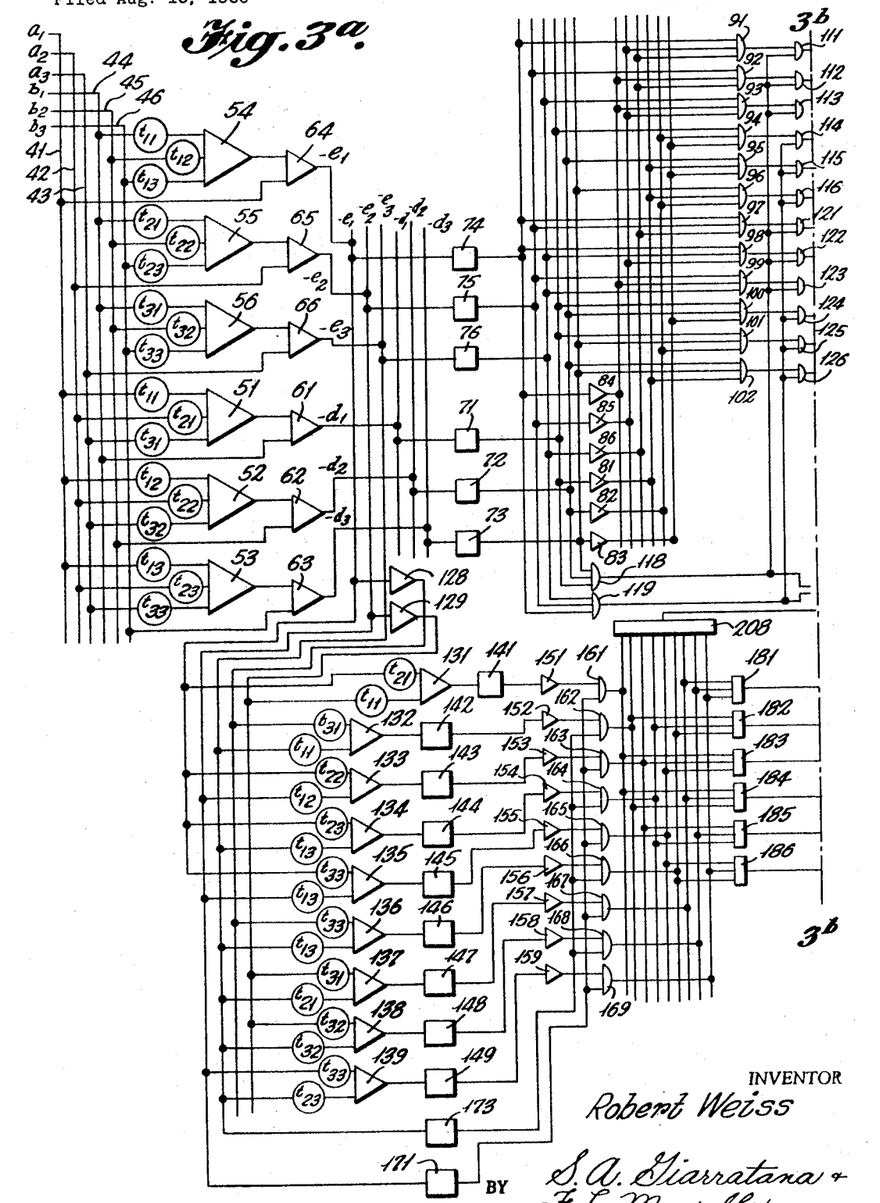
FIGS. 3a and 3b illustrate a block diagram of the circuitry used to identify malfunctioning vector sensors in accordance with the present invention.
Figure 3B:
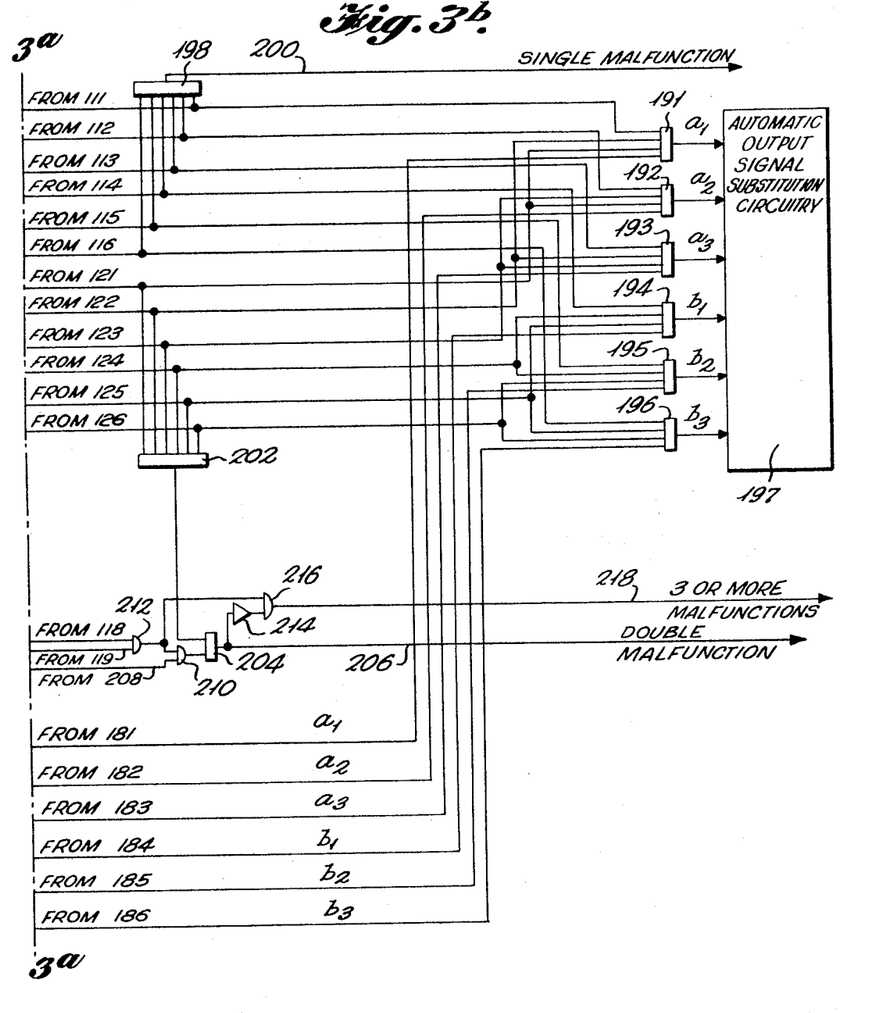

FIGURES 3a and 3b illustrate a block diagram showing how the malfunction detection system is mechanized. As shown in FIGURE 3a, the output signals from the vector sensors representing the values $a_1$, $a_2$, $a_3$, $b_1$, $b_2$ and $b_3$ are applied on input lines 41 through 46. The signals on input lines 41 through 43, representing $a_1$, $a_2$ and $a_3$, are applied to summing amplifiers 51, 52 and 53. The signals on input lines 44, 45 and 46 are applied to summing amplifiers 54, 55 and 56. The summing amplifiers 51 through 56 add the applied signals together, weighted in accordance with the designations in the circles on the inputs to the summing amplifier. The summing amplifier also functions to invert the sum of the output signals. Accordingly, the output of the amplifier 51 will equal $-t_{11}a_1 - t_{21}a_2 - t_{31}a_3 = -0.500 a_1 + 0.500 a_2 - 0.707 a_3$.

It will be noted that some of the terms in the summations performed by the summing amplifiers are negative and some are positive. The summing amplifiers 51 through 56 incorporate inverters to carry out the necessary summing of positive and negative terms in a conventional manner. The output from the summing amplifier 51 is summed with the signal on input line 44 representing $b_1$ in a summing amplifier 61 which also operates to invert the sum of the two applied input signals. Accordingly, the summing amplifier 61 will produce an output signal equal to $-b_1 + 0.500 a_1 - 0.500 a_2 + 0.707 a_3$. Accordingly, from Equation 16 it can be seen that the output from the summing amplifier 61 represents $-d_1$. Similarly, the output of the amplifier 52 is summed with the signal on input line 45 representing $b_2$ in a summing amplifier 62 to produce an output signal representing $-d_2$. Likewise, the output amplifier 53 is summed with the signal on input line 46 representing $b_3$ in a summing amplifier 63 to produce an output signal representing $-d_3$. Summing amplifiers 64 through 66 are connected to sum the outputs of the amplifiers 54 through 56 with the signals on input lines 41 through 43, respectively, to produce output signals representing $-e_1$, $-e_2$ and $-e_3$, respectively. In this manner, signals representing error terms $e_1$, $e_2$, $e_3$, $d_1$, $d_2$ and $d_3$ are generated.

Null detectors 71 through 76 are connected to receive the output of the amplifiers 61 through 66 and each of the null detectors 71 through 76 will produce an enabling output signal whenever the output from the corresponding one of summing amplifiers 61 through 66 is not at zero. The outputs from the null detectors 71 through 76 are applied to digital inverters 81 through 86 respectively. The digital inverters 81 through 86 each will produce an enabling output signal whenever it does not receive an enabling signal from the respective one of the null detectors 71 through 76 to which it is connected. Accordingly, each of the digital inverters 81 through 86 will produce an enabling output signal when the corresponding output signal from one of the summing amplifiers 61 through 66 is at null.

Twelve AND gates 91 through 102 are connected to receive different combinations of enabling output signals from the null detectors 71 through 76 and the digital inverters 81 through 86. Each of the AND gates 91 through 102 has three inputs and will produce an enabling output signal when it receives enabling signals on all three inputs. The AND gate 91 is connected to receive the output signals of the null detector 74 and of the digital inverters 85 and 86. Thus, the AND gate 91 will produce an output signal when the output signal from the summing amplifier 64 is not at null and the output signals from the summing amplifiers 65 and 66 are at null. Accordingly, the AND gate 91 will produce an output signal when $e_1$ is not 0 and $e_2$ and $e_3$ are 0. Similarly, the AND gate 92 is connected to receive a combination of enabling signals such that it will produce an enabling output signal when $e_2$ is not 0 and $e_1$ and $e_3$ are 0. Likewise, the AND gate 93 is connected to receive a combination of enabling signals such that it will produce an enabling output signal when $e_3$ is not 0 and $e_1$ and $e_2$ are 0. The AND gate 94 is connected to receive a combination of enabling signals such that it will produce an enabling output signal whenever $d_1$ is not 0 and $d_2$ and $d_3$ are 0. The AND gate 95 is connected to receive a combination of enabling signals such that it will produce an enabling output signal whenever $d_2$ is not 0 and $d_1$ and $d_3$ are 0. The AND gate 96 is connected to receive a combination of enabling signals such that it will produce an output signal when $d_3$ is not 0 and $d_1$ and $d_2$ are 0.

The outputs of the AND gates 91 through 96 are applied severally to a set of AND gates 111 through 116 respectively. An AND gate 118 is connected to receive the output signals produced by the null detectors 71 through 73 and will produce an enabling output signal when it receives enabling output signals from all three of the null detectors 71 through 73. An AND gate 119 is connected to receive enabling signals from the null detectors 74 through 76 and will produce an enabling output signal when it receives enabling output signals from all three of these null detectors. The output signal of the AND gate 118 is applied to the AND gates 111 through 113 and the output signal of the AND gate 119 is applied to the AND gates 114 through 116. The AND gates 111 through 116 each have two inputs and each will produce an enabling output signal when it receives enabling signals on both of its inputs. Thus, the AND gate 111 will produce an enabling output signal when $e_1$, $d_1$, $d_2$ and $d_3$ are not 0 and $e_2$ and $e_3$ are 0, which will be the condition of these error terms when only the vector sensor 13 is malfunctioning. Accordingly, the AND gate 111 will produce an enabling output signal when the only malfunctioning vector sensor is the vector sensor 13 causing $a_1$ to be incorrect. The AND gate 112 will produce an enabling output signal when $e_2$, $d_1$, $d_2$ and $d_3$ are not 0 and $e_1$ and $e_3$ are 0. Thus, the AND gate 112 will produce an enabling output signal when only the vector sensor 17 is malfunctioning causing $a_2$ to be incorrect. Similarly, the AND gate 113 will produce an enabling output signal when only the vector sensor 21 is malfunctioning causing the term $a_3$ to be incorrect. The AND gate 114 will produce an enabling output signal when only the vector sensor 25 is malfunctioning causing $b_1$ to be incorrect. The AND gate 115 will produce an enabling output signal when only the vector sensor 27 is malfunctioning causing $b_2$ to be incorrect and the AND gate 116 will produce an enabling output signal when only the vector sensor 29 is malfunctioning causing $b_3$ to be incorrect.

The outputs of the AND gates 97 through 102 are applied severally to AND gates 121 through 126 respectively. The output signal produced by the AND gate 118 is also applied to the AND gates 121 through 123 and the output signal produced by the AND gate 119 is also applied to the AND gates 124 through 126. Each of the AND gates 121 through 126 has two inputs and will produce an enabling output signal when it receives enabling signals applied to both of its inputs. The AND gate 97 is connected to receive the signals produced by the null detector 74, null detector 75 and by the inverter 86. Thus, the AND gate 97 will produce an enabling output signal when $e_1$ and $e_2$ are not 0 and $e_3$ is 0. Accordingly, the AND gate 121 will produce an enabling output signal when $e_1$, $e_2$, $d_1$, $d_2$ and $d_3$ are not 0 and $e_3$ is 0. Thus, the AND gate 121 will produce an enabling output signal when only the vector sensors 13 and 17 are malfunctioning causing the terms $a_1$ and $a_2$ to be incorrect. Similarly, the connections to the AND gate 98 are such that the AND gate 122 will produce an enabling output signal when the terms $e_1$, $e_3$, $d_1$, $d_2$ and $d_3$ are not 0 and the term $e_2$ is 0. Accordingly, the AND gate 122 will produce an enabling output signal when only the vector sensors 13 and 21 are malfunctioning causing the terms $a_1$ and $a_3$ to be incorrect. In a similar manner, it can be seen that the AND gate 123 will produce an enabling output signal when only the vector sensors 17 and 21 are malfunctioning causing $a_2$ and $a_3$ to be incorrect. The connections to the AND gates 100 and 124 are such that the AND gate 124 will produce an enabling output signal when only the vector sensors 25 and 27 are malfunctioning causing the terms $b_1$ and $b_2$ to be incorrect. The connections to the AND gates 101 and 125 are such that the AND gate 125 will produce an enabling signal when only the vector sensors 25 and 29 are malfunctioning causing the terms $b_1$ and $b_3$ to be incorrect, and the connections to the AND gates 102 and 126 are such that the AND gate 126 will produce an enabling output signal when only the vector sensors 27 and 29 are malfunctioning causing the terms $b_2$ and $b_3$ to be incorrect. Thus, one of the AND gates 121 through 126 will produce an enabling output signal when only two of the vector sensors are malfunctioning and the two malfunctioning vector sensors are in the same triad. The particular AND gate which produces an output signal will indicate which pair of vector sensors are malfunctioning.

The output signals of the summing amplifiers 64 and 65 representing the error terms $-e_1$ and $-e_2$ are applied to the inputs of analog inverters 128 and 129 so that the analog inverter 128 produces an output signal representing $+e_1$ and the analog inverter 129 produces an output signal representing $+e_2$. The outputs of the summing amplifiers 64, 65 and 66 representing the terms $-e_1$, $-e_2$ and $-e_3$ and the output of the analog inverters 128 and 129 representing $+e_1$ and $+e_2$ are applied in different combinations to a set of nine summing amplifiers 131 through 139.

The summing amplifiers 131 through 139 serve to test the validity of the Equations 25 through 33 to determine whether one, and only one, vector sensor is malfunctioning in each triad of vector sensors. Each of the summing amplifiers 131 through 139 tests the validity of a different one of the Equations 25 through 33. In the summing amplifiers 131 through 139, the input signals are weighted in accordance with the absolute value of the factors given in the circles shown on the inputs of the summing amplifiers. The specific values of these factors for the particular triad arrangement of the specific embodiment of the invention is given in Table II. Thus, the summing amplifier 131 will produce an output signal representing $t_{11}e_2 - t_{21}e_1$, which upon substituting the values from Table II becomes $0.500e_2 - 0.854e_1$. Accordingly, the summing amplifier 131 tests the validity of Equation 25. The summing amplifier 132 will produce an output representing $t_{31}e_1 - t_{11}e_3$ which, upon substituting the values from Table II becomes $0.146e_3 - 0.500e_3$. Thus, the output of the summing amplifier 132 will be null when Equation 26 is true. Similarly, it will be seen that the summing amplifiers 133 through 139 correspond to Equations 27 through 33, respectively, and the output of each summing amplifier will be null when the corresponding equation is true.

The outputs of the summing amplifiers 131 through 139 are applied to null detectors 141 through 149 respectively. Each of the null detectors 141 through 149 will produce an enabling output signal whenever the signal applied from the respective summing amplifier is not at null. The outputs from the null detectors 141 through 149 are applied to digital inverters 151 through 159, respectively, which inverters will produce an enabling output signal whenever they do not receive an enabling signal from the respective null detector. Thus, an enabling output from one of the inverters 151 through 159 will indicate that a particular one of the Equations 25 through 33 is true.

The outputs from the inverters 151 through 159 are applied to AND gates 161 through 169 respectively. The output of the summing amplifier 65 is applied to a null detector 171, which will apply an enabling signal to the AND gates 161, 163, 165, 167 and 169 whenever the output signal of the summing amplifier 65 representing $-e_2$ is not at null. The output of the summing amplifier 66 is applied to a null detector 173, which will apply an enabling signal to the AND gates 162, 164, 166 and 168 whenever the output signal of the summing amplifier 66 representing $-e_3$ is not at null.

The inverter 151, as pointed out above, will produce an enabling output signal whenever the Equation 25 is true, and thus the inverter 151 will produce an enabling output signal whenever the vector sensors 21 and 25 malfunction causing the terms $a_3$ and $b_1$ to be incorrect. However, Equation 25 will also be correct when the terms $e_1$ and $e_2$ are 0 and thus the inverter 151 will produce an enabling signal when $e_1$ and $e_2$ are 0, at which time the vector sensors 21 and 25 would not be malfunctioning. The AND gate 161 will produce an enabling output signal only when it receives an enabling signal from the inventer 151 and an enabling signal from the null detector 171 and thus will produce an enabling output signal only if $e_2$ is not 0. Accordingly, the AND gate 161 will produce an enabling output signal only when the vector sensor 21 and the vector sensor 25 are malfunctioning causing the terms $a_3$ and $b_1$ to be incorrect.

The AND gates 162 through 169 serve a function with respect to digital inverters 152 through 159 similar to that served by the AND gate 161 with respect to the output signal of the inverter 151. That is, each of the inverters 152 through 159 will produce an enabling output signal when a different pair of the vector sensors, one from each triad, are malfunctioning, but will also produce an enabling signal when the error terms of the equation being tested are 0. To eliminate the enabling signal in the latter case, the AND gates 162 through 169 are used. AND gates 162, 164, 166 and 168 will produce an enabling output signal only when the term $e_3$ is not 0. The AND gates 163, 165, 167 and 169 will produce an enabling signal only when the output signal of the summing amplifier 66 is not at null and, accordingly, only when $e_2$ is not 0. Thus the AND gate 162 will produce an output signal when only the vector sensors 17 and 25 are malfunctioning causing the terms $a_2$ and $b_1$ to be incorrect. The AND gate 163 will produce an enabling output signal when only the vector sensors 21 and 27 are malfunctioning causing the terms $a_3$ and $b_2$ to be incorrect. The AND gate 164 will produce an enabling output signal when only the vector sensors 17 and 27 are malfunctioning causing the terms $a_2$ and $b_2$ to be incorrect. The AND gate 165 will produce an enabling output signal when only the vector sensors 21 and 29 are malfunctioning causing the terms $a_3$ and $b_3$ to be incorrect. The AND gate 166 will produce an enabling output signal when only the vector sensors 17 and 29 are malfunctioning causing the terms $a_2$ and $b_3$ to be incorrect. The AND gate 167 will produce an enabling output signal when only the vector sensors 13 and 25 are malfunctioning causing the terms $a_1$ and $b_1$ to be incorrect. The AND gate 168 will produce an enabling output signal when only the vector sensors 13 and 27 are malfunctioning causing the terms $a_1$ and $b_2$ to be incorrect. The AND gate 169 will produce an enabling output signal when only the vector sensors 13 and 29 are malfunctioning causing the terms $a_1$ and $b_3$ to be incorrect.

The outputs of the AND gates 161 through 169 are connected in different combinations to the inputs of OR gates 181 through 186 so that the OR gates 181 through 186 will correspond to the terms $a_1$, $a_2$, $a_3$, $b_1$, $b_2$ and $b_3$, respectively, and each OR gate will produce an enabling output signal when the corresponding term is incorrect. Thus, the outputs of the OR gates 181 through 186 will indicate which vector sensors are malfunctioning when just one of the vector sensors of the primary triad is malfunctioning and just one of the vector sensors of the redundant triad is malfunctioning.

The references on the lines in FIG. 3b indicate from which AND gate or OR gate in FIG. 3a the lines come. As shown in FIG. 3b, the outputs from the AND gates 111 through 116 and 121 through 126 and from the OR gates 181 through 186 are applied in different combinations to inputs of OR gates 191 through 196 to provide an indication of which vector sensors are malfunctioning whenever not more than two of the vector sensors are malfunctioning. The connections to the OR gates 191 through 196 are such that they correspond to the terms $a_1$, $a_2$, $a_3$, $b_1$, $b_2$ and $b_3$, respectively, and each OR gate will produce an enabling output signal when the corresponding term is incorrect. The output signals of the OR gates 191 through 196 are applied to automatic signal substitution circuitry 197 which, in response to a signal from one or two of the OR gates 191 through 196 indicating that one or two of the terms $a_1$, $a_2$, $a_3$, $b_1$, $b_2$ and $b_3$ are incorrect, will substitute the correct signals for the incorrect signals.

The outputs from the AND gates 111 through 116 are connected through an OR gate 198 to an output 200 so that an enabling output signal will be produced on the output 200 when one and only one of the vector sensors is malfunctioning.

The outputs of the AND gates 121 through 126 are connected through an OR gate 202 and an OR gate 204 to an output 206. The outputs of the AND gates 161 through 169 are connected through an OR gate 208 to an AND gate 210. The output from the AND gates 118 and 119 are connected to an AND gate 212, which accordingly will produce an enabling output signal only when all of the output signals of the summing amplifiers 61 through 66 are not at null. The output signal of the AND gate 212 is applied to the AND gate 210. The output signal of the AND gate 210 is applied through the OR gate 204 to the output 206. Accordingly, an enabling signal will be produced on the output 206 whenever just two of the vector sensors are malfunctioning.

The output signal of the OR gate 204 is inverted by a digital inverter 214 and applied to an AND gate 216. The output of the AND gate 212 is also applied to the AND gate 216. Accordingly, the AND gate 216 will produce an enabling output signal on an output 218 whenever the output signals from all six of the summing amplifiers 61 through 66 are not at null and there are more than two malfunctioning vector sensors.

Figure 4:
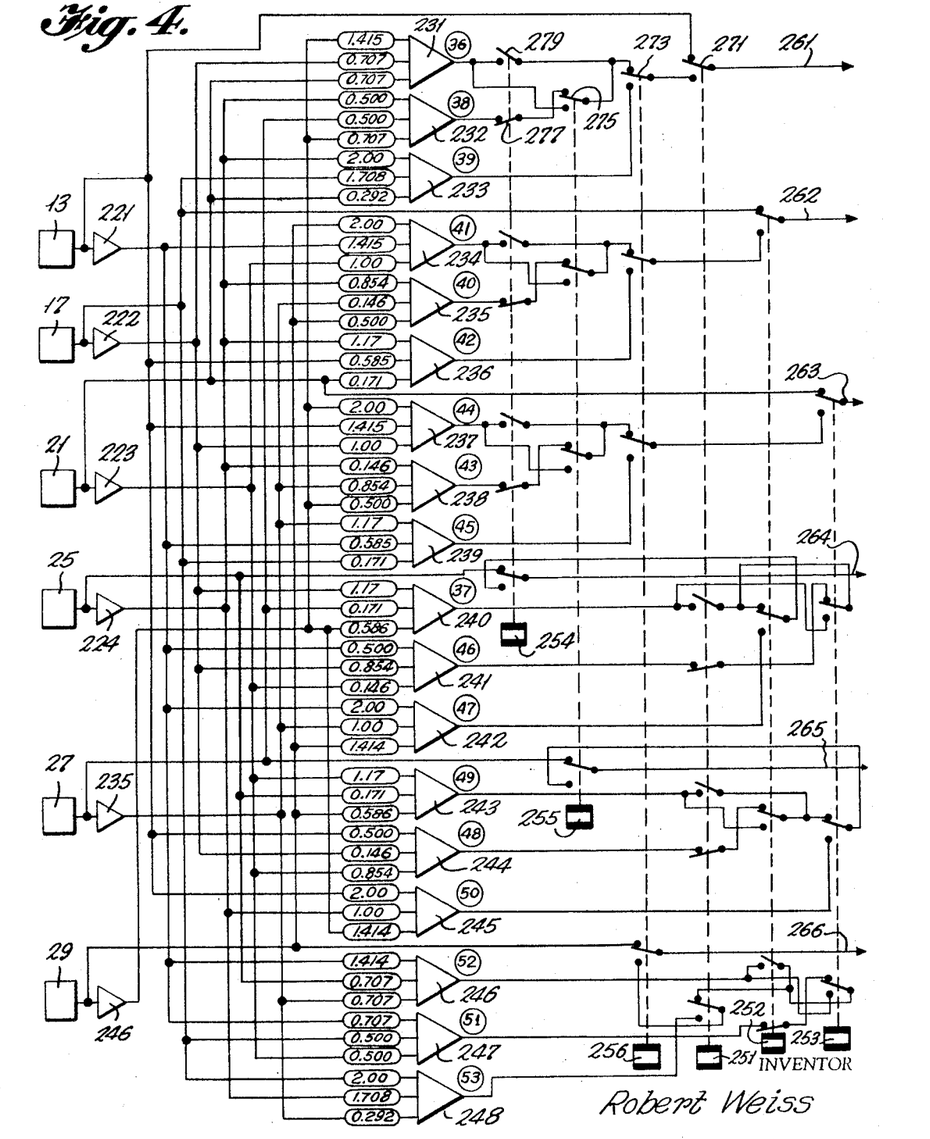
FIG. 4 is a circuit diagram illustrating the circuit for replacing the output signals of the vector sensors when the vector sensors malfunction.

The circuit of FIG. 4 illustrates the details of the automatic signal substitution circuit 197. If only a single vector sensor malfunctions, then the output signal of the single malfunctioning vector sensor can be replaced by summing the outputs of the three vector sensors of the other triad weighted as indicated in Equations 5 and 6. Similarly, if only two vector sensors malfunction, and they are in the same triad, the output signals from the two malfunctioning vector sensors can be replaced in the same manner. However, if the two malfunctioning vector sensors are in different triads, then the substitute output signals must be obtained in accordance with different equations which may be derived from Equations 5 and 6. For example, if the vector sensors 13 and 25 malfunction so that $a_1$ and $b_1$ are incorrect, these terms can be replaced by summing signals from the functioning vector sensors weighted in accordance with the following equations:

$$a_1 = (1/0.707)(b_3 + 0.500a_2 - 0.500a_3) \quad (34)$$
$$b_1 = (1/0.854)(a_2 - 0.146b_2 + 0.500b_3) \quad (35)$$

These equations reduce to the following equations:

$$a_1 = 1.415b_3 + 0.707a_2 - 0.707a_3 \quad (36)$$
$$b_1 = 1.17a_2 - 0.171b_2 + 0.586b_3 \quad (37)$$

Equation 36 can also be used to replace $a_1$ if the vector sensors 13 and 27 malfunction so that $a_1$ and $b_2$ are incorrect. Equation 37 can also be used to replace $b_1$ if the vector sensors 25 and 21 malfunction so that $b_1$ and $a_3$ are incorrect. A different equation must be used to replace $a_1$ if the incorrect terms are $a_1$ and $b_3$ since $b_3$ appears in Equation 36. Similarly, a different equation must be used to replace $b_1$ if the incorrect terms are $b_1$ and $a_2$.

Table III gives the equations for replacing all possible combinations of two or less terms which are in error as a result of vector sensor malfunction.

TABLE III

| Incorrect signal to be replaced | Incorrect signal combinations | Equation for substitution | Equation number |
|---|---|---|---|
| $a_1$ | $a_1$ only, $a_1$ and $a_2$, $a_1$ and $a_3$ | $a_1 = 0.500b_1 - 0.500b_2 + 0.707b_3$ | (38) |
| $a_1$ | $a_1$ and $b_1$, $a_1$ and $b_2$ | $a_1 = 1.415b_3 + 0.707a_2 - 0.707a_3$ | (36) |
| $a_1$ | $a_1$ and $b_3$ | $a_1 = 2.00b_1 - 1.708a_2 - 0.292a_3$ | (39) |
| $a_2$ | $a_2$ only, $a_2$ and $a_1$, $a_2$ and $a_3$ | $a_2 = 0.854b_1 + 0.146b_2 - 0.500b_3$ | (40) |
| $a_2$ | $a_2$ and $b_1$, $a_2$ and $b_2$ | $a_2 = -2.00b_3 + 1.415a_1 + 1.00a_3$ | (41) |
| $a_2$ | $a_2$ and $b_3$ | $a_2 = 1.17b_1 - 0.585a_1 - 0.171a_3$ | (42) |
| $a_3$ | $a_3$ only, $a_1$ and $a_3$, $a_2$ and $a_3$ | $a_3 = 0.146b_1 + 0.854b_2 + 0.500b_3$ | (43) |
| $a_3$ | $a_3$ and $b_1$, $a_3$ and $b_2$ | $a_3 = 2.00b_3 - 1.415a_1 + 1.00a_2$ | (44) |
| $a_3$ | $a_3$ and $b_3$ | $a_3 = 1.17b_2 + 0.585a_1 - 0.171a_2$ | (45) |
| $b_1$ | $b_1$ only, $b_1$ and $b_2$, $b_1$ and $b_3$ | $b_1 = 0.500a_1 + 0.854a_2 + 0.146a_3$ | (46) |
| $b_1$ | $a_1$ and $b_1$, $a_3$ and $b_1$ | $b_1 = 1.17a_2 - 0.171b_2 + 0.586b_3$ | (37) |
| $b_1$ | $a_2$ and $b_1$ | $b_1 = 2.00a_1 + 1.00b_2 - 1.414b_3$ | (47) |
| $b_2$ | $b_2$ only, $b_1$ and $b_2$, $b_2$ and $b_3$ | $b_2 = 0.500a_1 + 0.146a_2 - 0.854a_3$ | (48) |
| $b_2$ | $a_1$ and $b_2$, $a_2$ and $b_2$ | $b_2 = 1.17a_3 - 0.171b_1 - 0.586b_3$ | (49) |
| $b_2$ | $a_3$ and $b_2$ | $b_2 = -2.00a_1 + 1.00b_1 + 1.414b_3$ | (50) |
| $b_3$ | $b_3$ only, $b_1$ and $b_3$, $b_2$ and $b_3$ | $b_3 = 0.707a_1 - 0.500a_2 + 0.500a_3$ | (51) |
| $b_3$ | $a_2$ and $b_3$, $a_3$ and $b_3$ | $b_3 = 1.414a_1 - 0.707b_1 + 0.707b_2$ | (52) |
| $b_3$ | $a_1$ and $b_3$ | $b_3 = -2.00a_2 + 1.708b_1 + 0.292b_2$ | (53) |

As shown in FIG. 4, the output signals of the vector sensors 13, 17, 21, 25, 27 and 29 representing $a_1$, $a_2$, $a_3$, $b_1$, $b_2$ and $b_3$ are applied to analog invertetrs 221 through 226 respectively. The analog inverters 221 through 226 accordingly produce output signals representing $-a_1$, $-a_2$, $-a_3$, $-b_1$, $-b_2$ and $-b_3$ respectively. The output signals of the vector sensors and the analog inverters 221 through 226 are applied in different combinations of three to the summing amplifiers 231 through 248. Each of the summing amplifiers 231 through 248 weights the applied signals in accordance with the number appearing in the oval shown on the input lines to the summing amplifier and produces an output signal corresponding to the sum of the weighted input signals. Each of the summing amplifiers performs the summation indicated by a different one of the equations in Table III. For example, the summing amplifier 231 performs the summation indicated by Equation 36 to produce an output signal which can be substituted for the output signal of the vector sensor 13 representing $a_1$. The number in the small circle at the output of each summing amplifier designates the equation which indicates the summation performed by that summing amplifier.

Six relays 251 through 256 are provided to control the substitution of signals produced by the summing amplifiers 231 through 248 for the signals generated by the vector sensors when one or two of the vector sensors malfunction. The energization of the relays 251 through 256 is automatic in response to the output signals of the OR gates 191 through 196 in the malfunction detection circuit shown in FIGS. 3a and 3b. When the malfunction detection circuit indicates that the vector sensor 13 malfunctions by generating an enabling signal on the output of the OR gate 191, the relay 251 will be automatically energized. Likewise, when the malfunction detection circuit indicates that any of the vector sensors 17, 21, 25, 27 or 29 are malfunctioning, the relays 252 through 256, respectively, will be energized.

The circuitry for automatically energizing the relays 251 through 256 in response to the output signals of the malfunction detection circuit may merely consist of amplifiers connected severally between the outputs of the OR gates 191 through 196 of the malfunction detection circuit and the relays 251 through 256, respectively, to energize the relays in response to enabling signals being generated on the corresponding outputs of the OR gates. Instead of using automatic substitution of signals in case of malfunction, the substitution could be performed manually by an operator in response to visual signals produced by the malfunction detection circuit.

As shown in FIG. 4, the output signals of the vector sensors 13, 17, 21, 25, 27 and 29 representing $a_1$, $a_2$, $a_3$, $b_1$, $b_2$ and $b_3$ are fed directly over normally closed contacts of the relays 251 through 256 to the outputs 261 through 266 respectively of the system. If one of the vector sensors malfunctions, the corresponding relay wlil be energized, opening the normally closed contact in the direct path between the malfunctioning vector sensor and the corresponding output. In addition, other contacts will be closed to connect the output from the appropriate one of the summing amplifiers 231 through 248 to the one of the outputs 261 through 266 on which the signal produced by the malfunctioning vector sensor is supposed to appear. For example, if the vector sensors 13 and 29 should both malfunction, relays 251 and 256 will be energized. Accordingly, the contact 271 of the relay 251 will open the direct connection between the vector sensor 13 and the output 261 and will connect the output 261 to the contact 273 of the relay 256. The relay 256 being energized will have moved the contact 273 to connect to the output of the amplifier 233 which performs the summation indicated by the Equation 39 of Table III. Thus, the output signal of the amplifier 233 will be substituted on the output 261 for the output signal of the vector sensor 13.

If the only vector sensor malfunctioning were the vector sensor 13, the relay 256 would not be energized. Accordingly, the contact 273 would not be moved from its normally closed position and would connect the output 261 through the normally closed contacts 275 and 277 of the relays 255 and 254 to the output of the summing amplifier 232, which performs the summation indicated by the Equation 38 of Table III. Thus, the output signal of the summing amplifier 232 would replace the output signal of the vector sensor 13 on output 261.

If the vector sensor 13 and the vector sensor 27 are malfunctioning, contact 271 would connect the output 261 to the contact 273 which, since the relay 256 is not energized, will connect to the contact 275. The relay 255 being energized, its contact 275 will connect to the output of the summing amplifier 231, which performs the summation indicated by Equation 36 of Table III. Accordingly, the output signal of the summing amplifier 231 would be substituted for the output signal of the vector sensor 13 on output 261.

If the malfunctioning vector sensors are the vector sensors 13 and 25, the relays 251 and 254 will be energized. Accordingly, the output 261 will be connected over the contacts 271 and 273 to the normally open contact 279 of the relay 254. This contact will be closed through the energization of the relay 254 and thus the output signal of the summing amplifier 231 will be connected to the output 261 in substitution for the output signal of the vector sensor 13. In a similar manner, the output signals from the summing amplifiers 234 through 248 are substituted on the outputs 262 through 266 in accordance with Table III by contacts of the relays 251 through 256, as is shown in FIG. 4.

In the preferred embodiment of the present invention, the vector sensors are strapped down gyros measuring angular rate of rotation. However, it will be apparent that the system is applicable to other types of vector sensors. For example, the vector sensors could be accelerometers.

The system of the present invention requires that the redundant sensors have a specific orientation with respect to the primary triad of vector sensors. The specific orientation chosen, as pointed out above, maximizes the sensitivity of the system in checking for malfunction and the accuracy of the system in substituting output signals for those of the malfunctioning vector sensors. However, it will be clear that the particular arrangement is not essential and different angular positions between the two triads may be used. Such different angular positions would merely result in different values for the terms in Table II. In addition, it is not essential that either the primary or redundant vector sensors be arrayed along respective sets of axes which are orthogonal. Here again, non-orthogonal primary and/or redundant axes would merely result in different values for the corresponding terms in Table II.

The broad principles of the invention are not limited to a system in which there are three redundant vector sensors. Systems could be designed utilizing more or fewer redundant vector sensors, each sensing vectors along different axes than the vector sensors of the primary triad.

These and many other modifications may be made to the above described specific embodiment of the invention without departing from the spirit and scope of the invention which is defined in the appended claims.

What is claimed is:

1. A vector sensing system with malfunction detection comprising three primary vector sensors sensing the components of a vector along a first set of three axes, a plurality of redundant vector sensors sensing the components of said vector along three axes skewed relative to said first set of axes, and malfunction detection means responsive to the output signals of said primary and redundant vector sensors to indicate which, if any, of said vector sensors are malfunctioning.

2. A vector sensing system as recited in claim 1 wherein said first set of axes are orthogonal.

3. A vector sensing system as recited in claim 1 wherein said system comprises three redundant vector sensors sensing along three different axes skewed relative to said first set of axes.

4. A vector sensing system as recited in claim 3 wherein said first set of axes are orthogonal, and wherein said redundant vector sensors sense the components of said vector along orthogonal axes.

5. A vector sensing system as recited in claim 1 wherein there is provided substitute signal generating means responsive to the output signals of said vector sensors to generate substitute output signals corresponding to the output signals produced by said vector sensors to be used in place of the output signals of said vector sensors in case any of said vector sensors should malfunction.

6. A vector sensing system as recited in claim 5 wherein there is provided means responsive to an output signal of said malfunction detection means indicating that one of said vector sensors is malfunctioning to automatically substitute for the output signal of the malfunctioning vector sensor the corresponding output signal of said substitute signal generating means.

7. A vector sensing system as recited in claim 1 wherein said malfunction detection means is operative to indicate whether only one of the primary vector sensors and only one of the redundant vector sensors are malfunctioning and, if so, which of said vector sensors are malfunctioning.

8. A vector sensing system as recited in claim wherein said malfunction detection means is operative to indicate which two of said vector sensors are malfunctioning, if only two primary vector sensors are malfunctioning, or if only two redundant sensors are malfunctioning, said detection means also being operative to indicate when more than two of said vector sensors are malfunctioning.

9. A vector sensing system comprising three primary vector sensors operable to sense the components of a vector along a first set of three axes, three redundant vector sensors operable to sense the components of said vector along a second set of three axes skewed relative to said first set of axes, a plurality of summing means to sum the output signals of said vector sensors in different combinations with the output signals of said vector sensors being weighted so that the output signals resulting from each summing means will be at null if all the signals of said vector sensors applied to such summing means are correct, and means responsive to the output signals of said summing means to indicate which, if any, of said vector sensors are malfunctioning.

10. A vector sensing system as recited in claim 9 wherein each of a first three of said summing means sums the output signal of a different one of said primary vector sensors with the output signals of all three of said redundant vector sensors and each of a second three of said summing means sums the output signal of a different one of said redundant vector sensors with the output signals of all three of said primary vector sensors.

11. A vector sensing system as recited in claim 10 wherein said means responsive to the output signals of said summing means includes a plurality of additional summing means each connected to sum the output signals of a pair of the output signals of said first mentioned summing means, the pair of output signals being summed in each said additional summing means being selected and weighted so that the output signals of each said additional summing means will be at null if the output signals of a different pair of said vector sensors are incorrect, each of said pairs of vector sensors consisting of one primary vector sensor and one redundant vector sensors.

References Cited

UNITED STATES PATENTS

| | | | |
|---|---|---|---|
| 3,078,042 | 2/1963 | Grado | 235—189 X |
| 3,143,892 | 8/1964 | Chapman. | |
| 3,331,951 | 7/1967 | Webb | 235—150.25 |
| 3,391,568 | 7/1968 | Dozier. | |

MALCOLM A. MORRISON, Primary Examiner

CHARLES E. ATKINSON, Assistant Examiner

U.S. Cl. X.R.

33—226; 73—1, 178